Dec. 18, 1951 R. S. PENDERGAST ET AL 2,579,127
HEATER
Filed Dec. 30, 1946
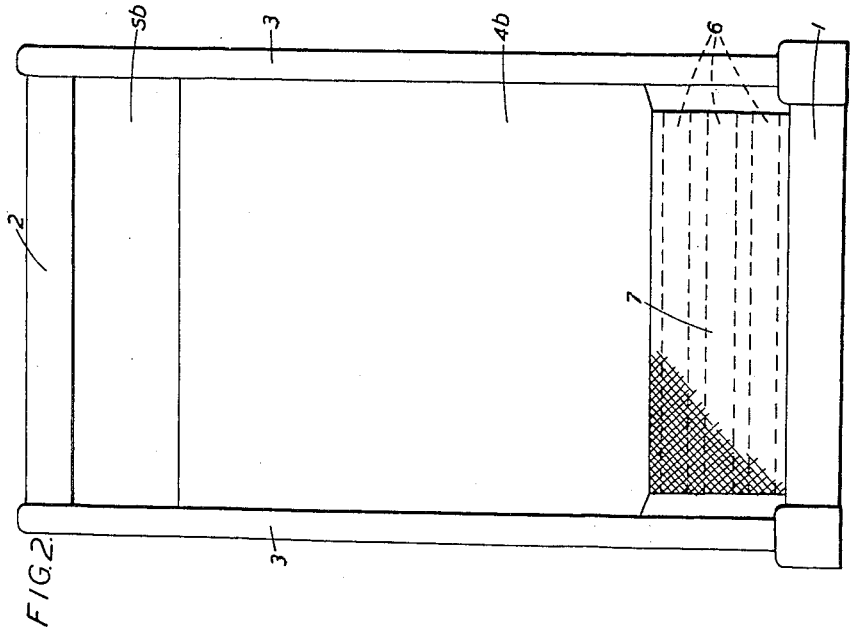
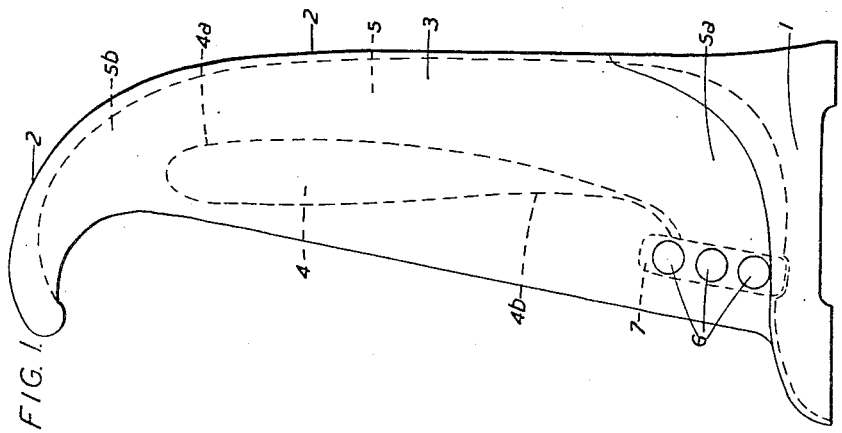
Richard Samuel Prendergast,
Charles Scott Prendergast,   Inventors
& Edward Thomas Winters,
By
John B. Brady
Attorney Patented Dec. 18, 1951

2,579,127

UNITED STATES PATENT OFFICE 2,579,127

HEATER

Richard Samuel Prendergast, Morden, Charles Scott Prendergast, Ashford Common, and Edward Thomas Winters, Chiswick, London, England Application December 30, 1946, Serial No. 719,282
In Great Britain January 7, 1946

10 Claims. (Cl. 219—34)

This invention relates to means for heating air or, if required, some other gaseous medium. More especially, though not exclusively, it is concerned with so-called space heaters for heating dwellings, offices, shops and factories.

Many convector type heaters are known comprising a casing affording a duct with ingress and egress openings for the passage of a stream of the gaseous medium to be heated, the said stream being inducted to flow over an element or elements heated for example by electricity or gas or liquid fuel so that it leaves the duct in a heated condition.

The present invention provides a more efficient heater of this general kind characterized by a heater element affording a multiplicity of openings of minute cross section for the passage of said stream of gaseous medium under its subdivision, in two directions normal to one another, into separate streamlets of correspondingly minute cross section. Thus the area of contact of the stream of gaseous medium with the heated element and accordingly the transfer of heat is very substantially increased.

Preferably the heater element surrounds a heating means in the form of one or more electric-resistance members or in the form of one or more gas or liquid fuel burners. However, said element may itself constitute an electric-resistance heating element.

Preferably also said heater element is arranged to bridge the ingress opening of the heater casing.

Merely by way of example an electric fire embodying one form of the invention is illustrated on the accompanying drawing, whereon:

Fig. 1 is a side view of the fire, and

Fig. 2 is a corresponding front view.

The illustrated electric fire or heater comprises an open-fronted casing composed of a base 1, a vertically extending and forwardly curved back wall 2, and two side walls 3, 3. Extending vertically between the said side walls is a breast member 4 whose rear surface 4a affords with the back wall 2 a Venturi-like duct 5 having an air ingress opening 5a at its lower end and an egress opening 5b at its upper end. The front surface 4b of the member 4 constitutes a reflector.

Extending across the ingress opening 5a is a bank of (three in the example) electric heating elements 6. These heating elements are enveloped by a gauze or meshwork 7 of heat-resistant material such as for example nickel-chrome alloy, so that air entering the duct 5 is compelled to pass through the interstices of the meshwork.

In the operation of the described and illustrated heater, electric current is supplied to the electric heating elements 6 from any convenient source of supply and through any suitable control switch or switches (not shown). Then, in the usual way the said elements, or so many of them as are switched on, become incandescent. These, in turn, heat the closely adjacent meshwork 7 to an elevated temperature. Part of the available heat is reflected forwards and outwards by the surface 4b, and substantially the remainder of the heat is transferred to the air current which is induced to flow into the duct 5 through the heated meshwork 7 bridging the ingress opening 5a. The heated air current, with gradual acceleration due to the Venturi shape of the duct, finally leaves the heater by way of the egress opening 5b in a forward and downward direction.

Since all the air passing through the duct has to pass, not only over the prime heating elements 6, but also through the interstices of the heated meshwork 7, it is very thoroughly heated. In fact the air current is subdivided into numerous streams of small cross section each of which makes intimate contact on all sides with the heated boundary surfaces of the meshes. The meshwork 7 is substantially in the shape of a polygonal figure which surrounds and is spaced from the electric heating element 6. The meshwork 7 has the side surfaces thereof extending in planes which are substantially normal with respect to each other, with the planes of two of the spaced parallel side surfaces extending across the ingress opening 5a and with the plane of the side surface at the upper portion of the meshwork 7 extending transversely with respect to the base of the front surface 4b of the breast member 4 for directing heat against said front surface. Because of the arrangement of the meshwork 7 in its position surrounding the electric heating element 6, streamlets of the gaseous medium under subdivision are directed substantially normal to one another, certain of the streamlets being directed through the Venturi-like duct 5, while others of the streamlets of the gaseous medium are directed against the front surface 4b of the reflector member 4.

The breast member 4 is streamlined in contour and has a transverse dimension which progressively varies upwardly from an extended lower leading edge projecting from a position at the rear of the enclosing meshwork gauze 7 adjacent said ingress opening 5a to an enlarged streamlined extremity terminating adjacent the egress opening 5b. Heat is directed outwardly from the egress opening 5b with the aid of the outwardly directed wall 2 of the Venturi-like duct 5. Heat is also directed outwardly from the front surface 4b of the breast member 4.

A fire as described may incorporate other features which it is unnecessary to illustrate but to which brief reference will now be made:

(a) Any convenient means may be employed to secure the heating elements in correct location, and such means may be such as to permit of their easy detachment and replacement;

(b) The walls of the duct 5 may be heat lagged to reduce heat losses through them, or the duct may have spaced double walls for this purpose;

(c) Any convenient means may be provided for regulating the air flow through the duct 5; for example, means may be provided for varying the effective area of the ingress opening 5a and/or the egress opening 5b;

(d) Provision may be made for introducing water vapour to the air passing through the duct 5; for example a water tank may be fitted in a convenient position with an escape opening allowing evaporation of moisture from the tank into the duct, and, if desired, such an arrangement may be used to evaporate germicides or air conditioning matter into the duct;

(e) A thermostat may be provided to regulate the applied heat or the rate of air flow;

(f) Means may be provided to regulate the proportion of moisture added to the air in dependence on the relative humidity of the ambient air.

Under modification of the described heater the heating elements 6 may be omitted and the meshwork heated directly by passing electric current therethrough. In such case the meshwork may be built up of conductive members separated by non-conductive members.

Obviously the invention is not restricted to electric fires or heaters, and gas or liquid or solid fuel burners may be arranged to heat the meshwork.

Instead of gauze or meshwork any other foraminous element may be employed, the essentiality being that it affords a considerable area of heating surface whilst providing a multiplicity of small channels through which air can pass. The size of the channels may be determined with relation to the applied heat and the length of the air duct.

The invention is not confined to space heaters. It may be applied to the heating of certain types of industrial furnaces (preheating furnaces) or lehrs.

We claim:

1. In a convector type heater comprising a casing having a duct extending in a substantially vertical column with ingress and egress openings for the passage of a stream of gaseous medium to be heated, a reflector extending across the front of said duct, a heater element comprising a screen forming a substantially rectangular enclosure having a multiplicity of openings of minute cross section therein for the passage of said stream of gaseous medium, said screen effecting the subdivision of said stream through two sides thereof in two directions substantially normal to one another into separate streamlets of correspondingly minute cross section, said heater element being located adjacent the ingress opening of said duct at the base of said vertical column for directing the streamlets at one side thereof against the surface of said reflector and from another side thereof through said vertical column, and means within said heater element for heating said element by radiation.

2. In a convector type heater comprising a casing having a duct extending in a substantially vertical column with ingress and egress openings for the passage of a stream of gaseous medium to be heated, a reflector extending across the front of said duct, means located at the base of said column and said reflector adjacent the ingress opening in said duct for heating said gaseous medium in its passage, and an element surrounding said heating means, said element including a multiplicity of openings of minute cross section for the passage of said stream of gaseous medium, said element effecting the subdivision of said stream into separate streamlets of correspondingly minute cross section and directing certain of said streamlets over the front of said reflector and others of said streamlets through said vertical column.

3. In a convector type heater comprising a casing having a duct extending in a substantially vertical column with ingress and egress openings for the passage of a stream of gaseous medium to be heated, a reflector extending across the front of said duct, at least one electric-resistance heating member in the path of movement of the stream of gaseous medium through said duct, an element surrounding said heating member so as to be heated thereby, said element having a multiplicity of openings of minute cross section for the passage of said stream of gaseous medium, said element effecting the subdivision of said stream into separate streamlets of correspondingly minute cross section and directing certain of said streamlets over the front of said reflector and others of said streamlets through said vertical column.

4. A convector type heater according to claim 1 in which said element is disposed in a plane bridging the ingress opening of said duct and extends to a position adjacent the base of the front of said reflector.

5. A convector type heater according to claim 2 in which said heating member and said surrounding element are disposed in planes bridging the ingress opening of said duct and extends to a position adjacent the base of the front of said reflector.

6. A convector type heater according to claim 3 in which said electric-resistance heating member and said surrounding element are disposed in planes offset from each other and bridging the ingress opening of said duct and extending to a position adjacent the base of the front of said reflector.

7. A convector type heater according to claim 1 in which said heater element is constituted by an electric-resistance heating element disposed in a plane bridging the ingress opening of said duct and extending to a position adjacent the base of the front of said reflector.

8. A convector type heater comprising a vertically extending casing having an open front, a vertically extending and forwardly curved back wall for said casing with closed side walls extending in planes normal thereto, a breast member extending between said side walls and spaced from the surface of said back wall and forming a heat reflecting surface at the open front of said casing, the rear surface of said breast member and the surface of said back wall forming a Venturi-like duct having an ingress opening at its lower end and an egress opening at its upper end, said breast member varying in its transverse dimension progressively upwardly from the ingress opening to the egress opening of said duct, electric heating elements extending between said side walls adjacent said ingress opening and adjacent the base of the front of said heat reflecting surface and an enclosing gauze having a multiplicity of openings of minute section surrounding said electric heating elements with the openings thereof in the flow path of the stream of gaseous medium to be heated for subdividing the gaseous medium into separate streamlets of corresponding minute cross section and directing certain of said streamlets over the front of said reflector and others of said streamlets through said vertical column.

9. A convector type heater comprising a vertically extending casing having an open front, a vertically extending and forwardly curved back wall for said casing with closed side walls extending in planes normal thereto, a breast member extending between said side walls and spaced from the surface of said back wall and forming a heat reflecting surface at the open front of said casing, the rear surface of said breast member and the surface of said back wall forming a Venturi-like duct having an ingress opening at its lower end and an egress opening at its upper end, said breast member varying in its transverse dimension progressively upwardly from the ingress opening to the egress opening of said duct electric heating elements extending between said side walls adjacent said ingress opening and a gauze having a multiplicity of openings of minute section surrounding said electric heating elements with the openings thereof in the flow path of the stream of gaseous medium to be heated for subdividing the gaseous medium into separate streamlets of corresponding minute cross section.

10. A convector type heater comprising a vertically extending casing having an open front, a vertically extending and forwardly curved back wall for said casing with closed side walls extending in planes normal thereto, a breast member extending between said side walls and spaced from the surface of said back wall and forming a heat reflecting surface at the open front of said casing, the rear surface of said breast member and the surface of said back wall forming a Venturi-like duct having an ingress opening at its lower end and an egress opening at its upper end, electric heating elements extending between said side walls adjacent said ingress opening and adjacent the base of the front of said heat reflecting surface and an enclosing gauze having a multiplicity of openings of minute section surrounding said electric heating elements with the openings thereof in the flow path of the stream of gaseous medium to be heated for subdividing the gaseous medium into separate streamlets of corresponding minute cross section and directing certain of said streamlets over the front of said reflector and others of said streamlets through said vertical column, said breast member having a streamlined transverse section with an extended lower leading edge projecting from a position at the rear of said enclosing gauze adjacent said ingress opening contiguous with said heat reflecting surface and extending upwardly into an enlarged streamlined extremity terminating adjacent said egress opening.

RICHARD SAMUEL PRENDERGAST.
CHARLES SCOTT PRENDERGAST.
EDWARD THOMAS WINTERS.

REFERENCES CITED

The following references are of record in the file of this patent:

UNITED STATES PATENTS

| Number | Name | Date |
|---|---|---|
| 1,701,096 | Bowling et al. | Feb. 5, 1929 |
| 1,705,812 | Fisher | Mar. 19, 1929 |
| 1,730,203 | Guest | Oct. 1, 1929 |
| 1,740,336 | Crittal et al. | Dec. 17, 1929 |
| 2,165,970 | Jaspers | July 11, 1939 |
| 2,313,786 | Van Daam | Mar. 16, 1943 |

FOREIGN PATENTS

| Number | Country | Date |
|---|---|---|
| 133,505 | Great Britain | Oct. 16, 1919 |
| 187,739 | Great Britain | Nov. 2, 1922 |